(12) United States Patent
Abotabl et al.

(10) Patent No.: US 11,516,775 B2
(45) Date of Patent: Nov. 29, 2022

(54) PROBABILITY-BASED UTILIZATION OF SIDELINK RESOURCES

(71) Applicant: QUALCOMM Incorporated, San Diego, CA (US)

(72) Inventors: Ahmed Attia Abotabl, San Diego, CA (US); Ahmed Elshafie, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 17/248,102

(22) Filed: Jan. 8, 2021

(65) Prior Publication Data

US 2022/0225281 A1 Jul. 14, 2022

(51) Int. Cl.
*H04W 72/02* (2009.01)
*H04W 72/04* (2009.01)

(52) U.S. Cl.
CPC ....... *H04W 72/02* (2013.01); *H04W 72/0406* (2013.01); *H04W 72/0493* (2013.01)

(58) Field of Classification Search
None
See application file for complete search history.

(56) References Cited

U.S. PATENT DOCUMENTS

| | | | | |
|---|---|---|---|---|
| 11,252,753 | B2* | 2/2022 | Chen | H04L 1/1896 |
| 2015/0334760 | A1 | 11/2015 | Sartori et al. | |
| 2018/0206260 | A1* | 7/2018 | Khoryaev | H04W 72/1284 |
| 2019/0159174 | A1* | 5/2019 | Seo | H04W 76/14 |
| 2020/0296690 | A1* | 9/2020 | Lee | H04W 72/02 |
| 2020/0367111 | A1 | 11/2020 | Nguyen et al. | |
| 2021/0227464 | A1* | 7/2021 | Kung | H04W 52/0216 |
| 2021/0227465 | A1* | 7/2021 | Kung | H04W 72/02 |
| 2021/0227622 | A1* | 7/2021 | Kung | H04W 72/0406 |
| 2021/0235396 | A1* | 7/2021 | Jung | H04W 52/48 |
| 2021/0314821 | A1* | 10/2021 | Huang | H04W 72/0446 |
| 2021/0377912 | A1* | 12/2021 | El Hamss | H04L 1/1819 |
| 2022/0030575 | A1* | 1/2022 | Farag | H04W 76/14 |
| 2022/0086803 | A1* | 3/2022 | Li | H04W 72/0453 |
| 2022/0104126 | A1* | 3/2022 | Lee | H04W 52/0219 |

FOREIGN PATENT DOCUMENTS

EP 3335495 A1 6/2018

OTHER PUBLICATIONS

International Search Report and Written Opinion—PCT/US2021/072985—ISA/EPO—Apr. 8, 2022.

(Continued)

*Primary Examiner* — Kodzovi Acolatse

(74) *Attorney, Agent, or Firm* — Harrity & Harrity, LLP

(57) ABSTRACT

Various aspects of the present disclosure generally relate to wireless communication. In some aspects, a user equipment (UE) may select a resource to utilize for transmitting a sidelink communication based at least in part on a probability. The UE may transmit, to another UE in a sidelink network, the sidelink communication utilizing the resource based at least in part on selecting the resource. Numerous other aspects are provided.

30 Claims, 8 Drawing Sheets

(56) References Cited

OTHER PUBLICATIONS

OPPO: "Discussions on Resource Reservation, Sensing and Selection in Mode 2", 3GPP TSG-RAN WG1 Meeting #98bis, 3GPP Draft, R1-1910379 OPPO—Mode 2 RA, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019 Oct. 8, 2019 (Oct. 8, 2019), 12 Pages, XP051809109, Retrieved from the Internet: URL: https://ftp.3gpp.org/tsg_ran/WG1_RL1/TSGR1_98b/Docs/R1-1910379.zip R1-1910379 OPPO—Mode 2 RA.docx, [retrieved on Oct. 8, 2019] the whole document.

\* cited by examiner

PROBABILITY-BASED UTILIZATION OF SIDELINK RESOURCES

FIELD OF THE DISCLOSURE

Aspects of the present disclosure generally relate to wireless communication and to techniques and apparatuses for providing probability-based utilization of sidelink resources.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes selecting a resource to utilize for transmitting a sidelink communication based at least in part on a probability; and transmitting, to another UE in a sidelink network, the sidelink communication utilizing the resource based at least in part on selecting the resource.

In some aspects, a UE for wireless communication includes a memory and one or more processors operatively coupled to the memory, the memory and the one or more processors configured to: select a resource to utilize for transmitting a sidelink communication based at least in part on a probability; and transmit, to another UE in a sidelink network, the sidelink communication utilizing the resource based at least in part on selecting the resource.

In some aspects, a non-transitory computer-readable medium storing a set of instructions for wireless communication includes one or more instructions that, when executed by one or more processors of a UE, cause the UE to: select a resource to utilize for transmitting a sidelink communication based at least in part on a probability; and transmit, to another UE in a sidelink network, the sidelink communication utilizing the resource based at least in part on selecting the resource.

In some aspects, an apparatus for wireless communication includes means for selecting a resource to utilize for transmitting a sidelink communication based at least in part on a probability; and means for transmitting, to another apparatus in a sidelink network, the sidelink communication utilizing the resource based at least in part on selecting the resource.

Aspects generally include a method, apparatus, system, computer program product, non-transitory computer-readable medium, user equipment, base station, transmitter, wireless communication device, and/or processing system as substantially described herein with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
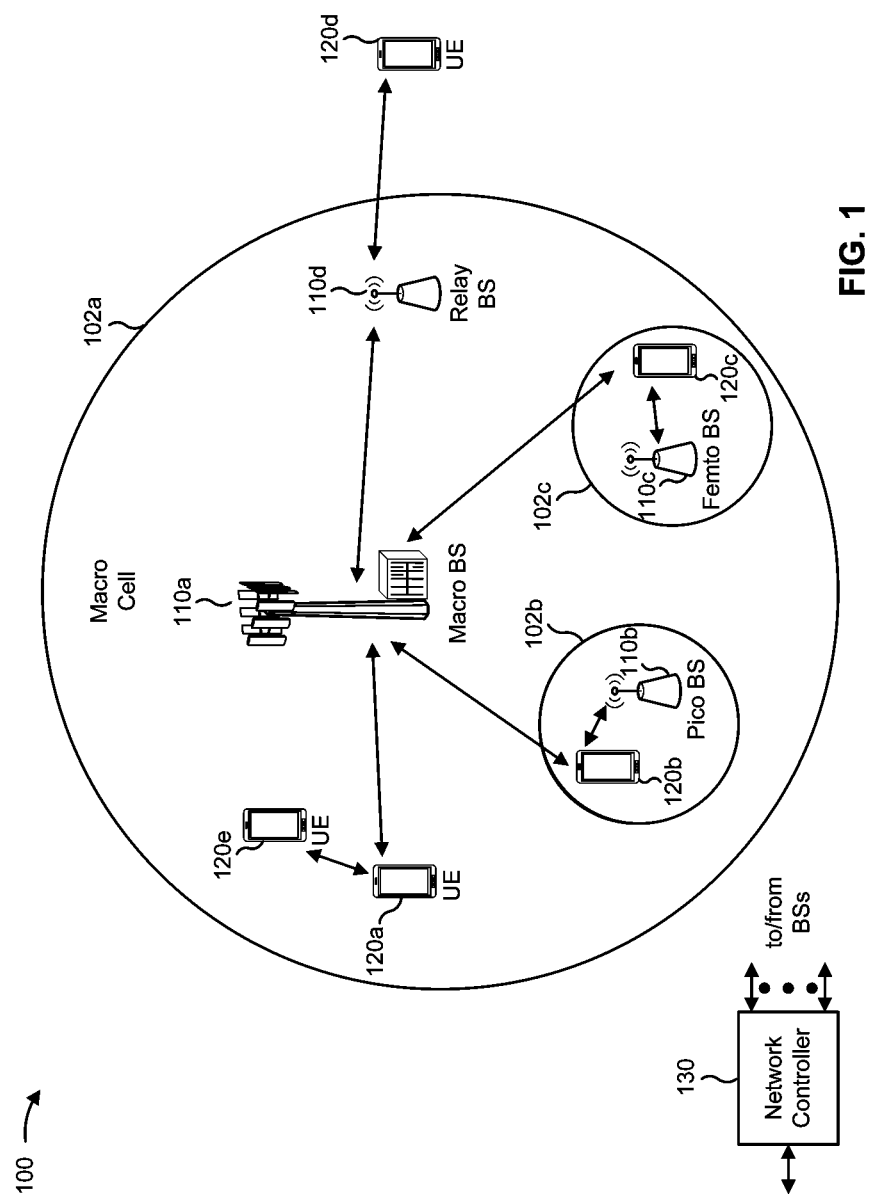
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 Hz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
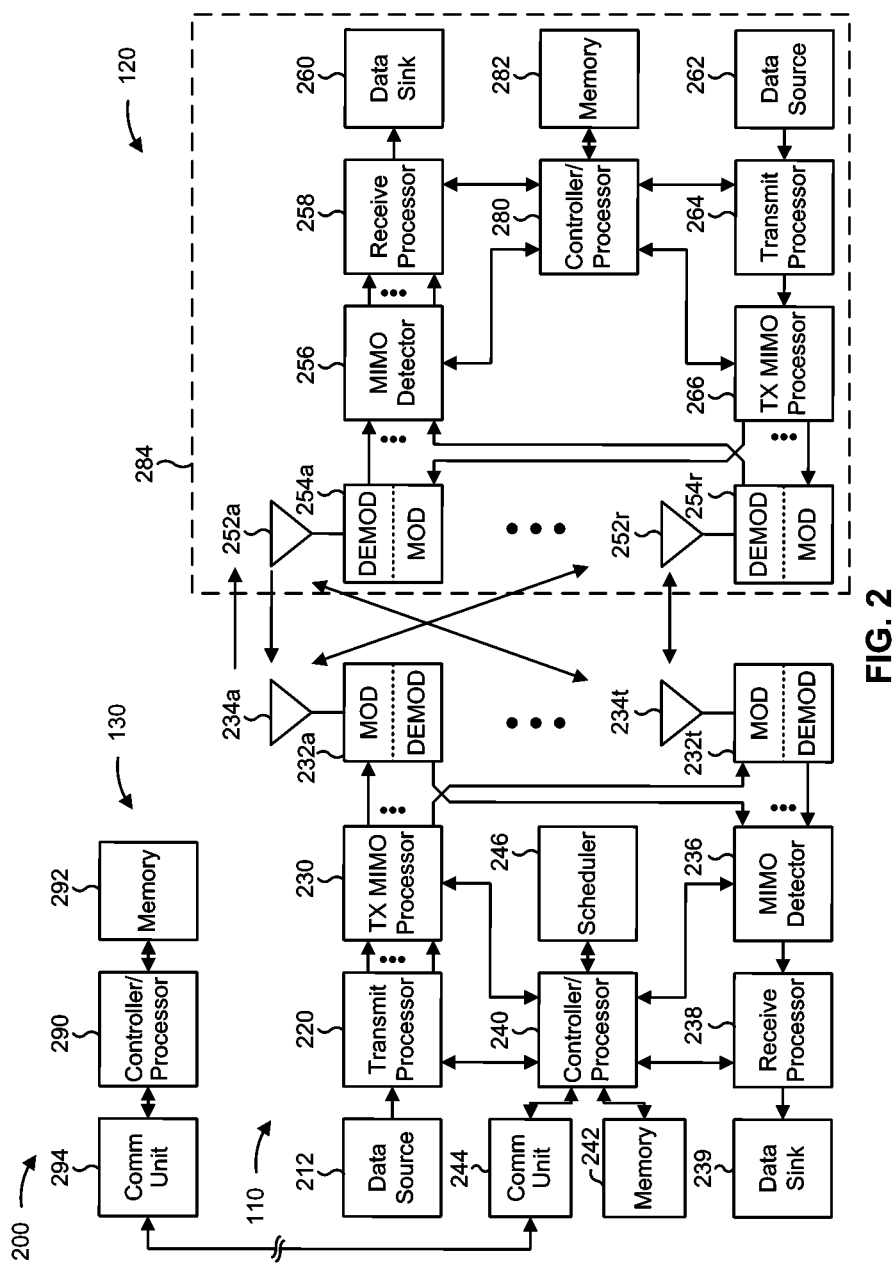
FIG. 2 is a diagram illustrating an example of a base station in communication with a UE in a wireless network, in accordance with various aspects of the present disclosure.
Figure 3:
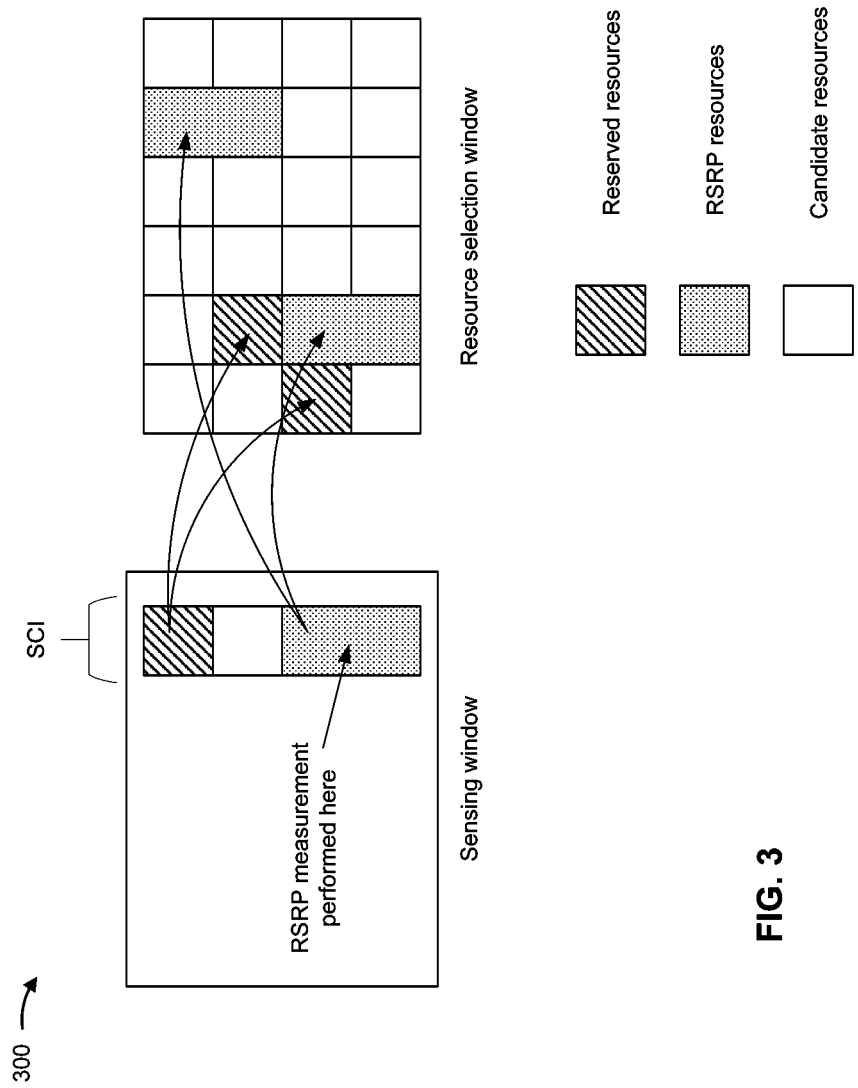
FIG. 3 is a diagram illustrating an example associated with providing probability-based utilization of sidelink resources, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-8.

Controller/processor 240 of base station 110, controller/processor 280 of UE 120, and/or any other component(s) of FIG. 2 may perform one or more techniques associated with providing probability-based utilization of sidelink resources, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 700 of FIG. 7 and/or other processes as described herein. In some aspects, executing instructions may include running the instructions, converting the instructions, compiling the instructions, interpreting the instructions, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

In some aspects, a UE (e.g., UE 120) includes means for selecting a resource to utilize for transmitting a sidelink communication based at least in part on a probability; and/or means for transmitting, to another UE in a sidelink network, the sidelink communication utilizing the resource based at least in part on selecting the resource. The means for the UE to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE includes means for updating the probability based at least in part on a feedback message received from the other UE.

In some aspects, the UE includes means for updating the probability based at least in part on a policy parameter received from the other UE.

In some aspects, the UE includes means for determining that the resource is an unavailable resource.

In some aspects, the UE includes means for determining that the resource is an available resource.

In some aspects, the UE includes means for determining whether to use a sensed selection scheme that uses sidelink control information or to use a random selection scheme to select the resource.

As indicated above, FIG. 2 is provided as an example. Other examples may differ from what is described with regard to FIG. 2.

A sidelink network may include a base station and a plurality of UEs. The base station may communicate with each of the plurality of UEs via respective access links. The plurality of UEs may operate in sidelink modes to communicate (e.g., transmit and/or receive data) with one another via one or more sidelink channels.

In one sidelink mode (e.g., Mode-1 Resource Allocation Mode), the base station may configure and control utilization of sidelink resources (e.g., subchannels) accessible for sidelink communication. For instance, the base station may configure a predetermined number of sidelink resources and may control selection by a transmitting UE of one or more of the configured sidelink resources to transmit data to one or more receiving UEs.

In another sidelink mode (e.g., Mode-2 Resource Allocation Mode), the base station may configure the predetermined number of sidelink resources accessible for sidelink communication. The plurality of UEs, and not the base station, may control utilization of the configured sidelink resources by performing scheduling of communications in the sidelink network. For instance, without involvement of the base station, the transmitting UE may autonomously select one or more of the configured sidelink resources by scheduling transmissions thereon to transmit data to the one or more receiving UEs.

The transmitting UE may autonomously select one or more of the configured sidelink resources by using a sensed selection scheme or a random selection scheme. In the sensed selection scheme, the transmitting UE may utilize a sensing window that includes sidelink control information (SCI) received in a communication from another UE in the sidelink network. The SCI may indicate reservation of one or more of the configured sidelink resources for utilization by the other UE. For instance, as shown in example 300 of FIG. 3, the sensing window may include the SCI received from the other UE. The transmitting UE may decode the SCI to determine the one or more of the configured sidelink resources that are reserved for utilization by the other UE (e.g., reserved resources). Such reserved resources may be projected onto a resource selection window that shows possible resources available for utilization by the transmitting UE. The reserved resources may be excluded from the possible resources and may not be utilized by the transmitting UE.

The transmitting UE may also perform received signal reference power (RSRP) measurements associated with the reserved resources, and may determine RSRP resources for which the RSRP measurements satisfy a threshold RSRP level (e.g., RSRP measurement is equal to or greater than the threshold RSRP level). Such RSRP resources may be impacted by utilization of the reserved resources by the other UE, and may not be utilized by the transmitting UE.

The transmitting UE may utilize resources for which the RSRP measurements fail to satisfy the threshold RSRP level (e.g., RSRP measurement is lower than the threshold RSRP level). Additionally, the transmitting UE may utilize one or more of a remainder of the resources within the resource selection window. Resources that the transmitting UE may utilize may be collectively referred to as candidate resources.

In the random selection scheme, the transmitting UE may randomly select and utilize a configured sidelink resource without consideration of prior reservation of the selected configured sidelink resource by another UE in the sidelink network.

The decision by the transmitting the UE to use the sensed selection scheme or to use the random selection scheme may negatively impact utilization of sidelink resources in the sidelink network. For instance, using the random selection scheme may enable the transmitting UE to avoid a delay in transmitting, for example, ultra-reliable low-latency communication (URLLC) data. However, when an amount of traffic (e.g., transmissions and/or receptions) in the sidelink network satisfies a threshold amount (e.g., the amount of traffic is equal to or higher than the threshold amount), using the random selection scheme may result in a contention such that the transmitting UE may utilize a sidelink resource previously reserved for utilization by another UE. As a result, data communication in the sidelink network may experience a suspension or stoppage.

Using the sensed selection scheme may enable the transmitting UE to utilize candidate resources such that a contention is avoided. However, even when the amount of traffic in the sidelink network fails to satisfy the threshold amount (e.g., the amount of traffic is lower than the threshold amount), using the sensed selection scheme may render a resource unavailable which may have otherwise been available to the transmitting UE. For instance, the RSRP threshold level, against which an RSRP measurement is compared to determine availability of a sidelink resource, may be lower than a given level such that a sidelink resource is determined to be a reserved resource (unavailable to the transmitting UE) and should have otherwise been determined as a candidate resource (available to the transmitting UE).

Various aspects of techniques and apparatuses described herein may provide probability-based utilization of sidelink resources. In some aspects, the techniques and apparatuses described herein may enable a transmitting UE in a sidelink network to choose to use the sensed selection scheme or to use the random selection scheme based at least in part on a probability p. In the random selection scheme, the transmitting UE may select to utilize a sidelink resource based at least in part on a probability p1. In the sensed selection scheme, the transmitting UE may select to utilize a candidate resource based at least in part on a probability p2 and/or to utilize a reserved resource based at least on a probability p3. In some aspects, by utilizing the probability-based utilization of sidelink resources, as described herein, the transmitting UE may select to drop (e.g., not utilize) a candidate resource that is otherwise available to the transmitting UE and/or to utilize a reserved resource that is otherwise unavailable to the transmitting UE based at least in part on an amount of traffic in the sidelink network. In this way, the transmitting UE may utilize sidelink resources based at least in part on adapting to traffic conditions in the sidelink network. Additionally, the transmitting UE may assist in efficient utilization of sidelink resources while minimizing delays in transmitting, for example, URLLC data and/or avoiding a contention in the sidelink network. As a result, data communication among the UEs in the sidelink network may be improved.

In some aspects, the UE may select a resource to utilize for transmitting a sidelink communication based at least in part on a probability, and transmit, to another UE in a sidelink network, the sidelink communication utilizing the resource based at least in part on selecting the resource.

Figure 4:
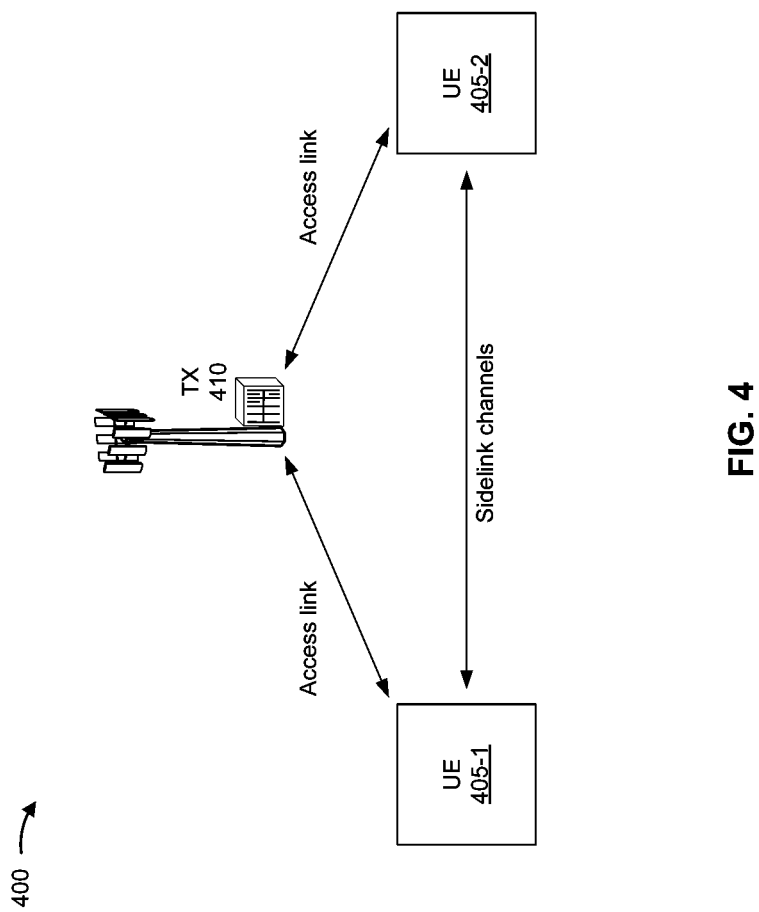
FIG. 4 is a diagram illustrating an example associated with providing probability-based utilization of sidelink resources, in accordance with various aspects of the present disclosure.

FIG. 4 is a diagram illustrating an example 400 associated with providing probability-based utilization of sidelink resources, in accordance with various aspects of the present disclosure. A sidelink network may include a transmitter (TX) 410 and a plurality of UEs (shown as UE 405-1 and UE 405-2). The TX 410 may include, for example, a base station (e.g., BS 110) or a relay device. The relay device may include a network node such as, for example, a relay BS, a relay UE, and/or an integrated access and backhaul (IAB) node. As shown in FIG. 4, the UE 405-1 and the UE 405-2 (collectively referred to as UEs 405) may communicate (e.g., transmit and/or receive data) with one another via one or more sidelink channels. In the sidelink network, a transmitting UE (e.g., the UE 405-1) may communicate with one or more receiving UEs (e.g., the UE 405-2) that receive communications transmitted by the transmitting UE.

The TX 410 may communicate with the UE 405-1 via a first access link and/or communicate with the UE 405-2 via a second access link. In some aspects, a sidelink channel between the UEs 405 may be implemented utilizing, for example, a PC5 interface, and an access link between the TX 410 and a UE (e.g., the UE 405-1 or the UE 405-2) may be implemented utilizing, for example, a Uu interface. Sidelink communications may be transmitted and received via the sidelink channels, and access link communications may be transmitted and received via the access links. The UEs 405 may include one or more UEs described elsewhere herein, such as UE 120 discussed with respect to FIG. 2.

As indicated above, FIG. 4 is provided as an example. Other examples may differ from what is described with respect to FIG. 4.

Figure 5:
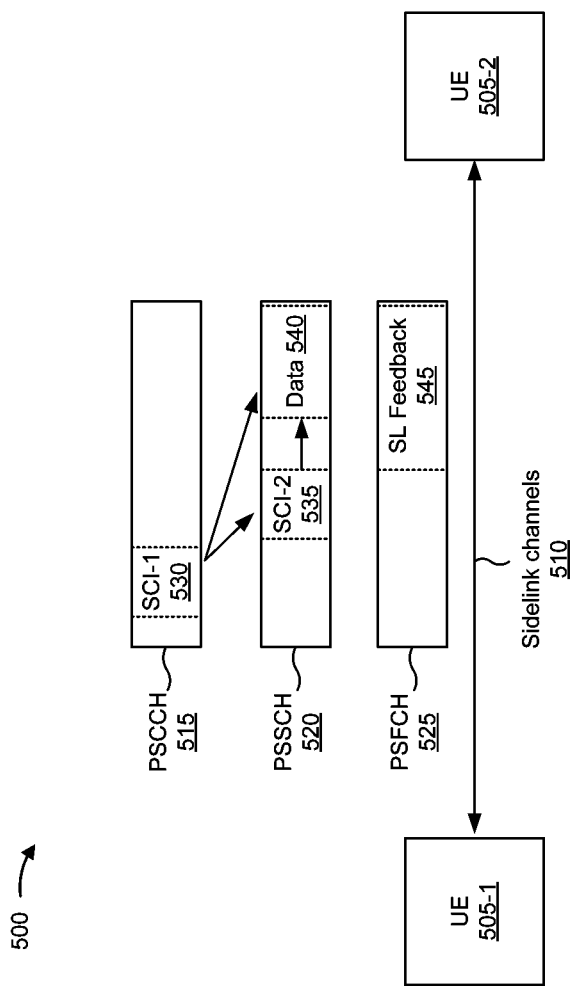
FIG. 5 is a diagram illustrating an example associated with providing probability-based utilization of sidelink resources, in accordance with various aspects of the present disclosure.

FIG. 5 is a diagram illustrating an example 500 associated with providing probability-based utilization of sidelink resources, in accordance with various aspects of the present disclosure. A sidelink communication network may include a plurality of UEs including, for example, UE 505-1 and UE 505-2 communicating with each other (and one or more other UEs associated with the sidelink communication network) using one or more sidelink channels 510. The plurality of UEs included in the sidelink communication network may include a plurality of UEs within a given geographical area (e.g., a given radius around a given UE). In some aspects, the plurality of UEs within the given geographical area may provide a UE density associated with the sidelink communication network. The UE density may identify a number of UEs within a threshold distance of the given UE. In some aspects, the UE 505-1 and the UE 505-2 (collectively referred to as UEs 505) may include one or more UEs described elsewhere herein, such as UE 120 discussed with respect to FIG. 2 and/or the UEs 405 discussed with respect to FIG. 4.

As shown in FIG. 5, the UE 505-1 may communicate with the UE 505-2 (and one or more other UEs) via sidelink channels 510. Communications utilizing the one or more sidelink channels 510 may include, for example, P2P communications, D2D communications, V2X communications (e.g., V2V communications, V2I communications, and/or vehicle-to-person (V2P) communications), and/or mesh networking communications.

In some aspects, the sidelink channels 510 may use a PC5 interface and/or may operate in, for example, a high frequency band (e.g., the 5.9 GHz band) and/or an unlicensed or shared frequency band (e.g., an NR unlicensed (NR-U) frequency band). Additionally, or alternatively, the UEs 505 may synchronize a timing of transmission time intervals (TTIs) (e.g., frames, subframes, slots, and/or symbols) using global navigation satellite system (GNSS) timing.

As further shown in FIG. 5, the sidelink channels 510 may include a physical sidelink control channel (PSCCH) 515, a physical sidelink shared channel (PSSCH) 520, and/or a physical sidelink feedback channel (PSFCH) 525. The PSCCH 515 may be used to communicate control information, similar to a physical downlink control channel (PDCCH) and/or a physical uplink control channel (PUCCH) used for cellular communications with, for example, TX 410 via an access link or an access channel. The PSSCH 520 may be used to communicate data, similar to a physical downlink shared channel (PDSCH) and/or a physical uplink shared channel (PUSCH) used for cellular communications with, for example, TX 410 via an access link or an access channel.

The sidelink channels 510 may carry sidelink control information (SCI) to indicate various control information used for sidelink communications. The sidelink control information may include, for example, sidelink control information part 1 (SCI-1 530 and sidelink control information part 2 (SCI-2) 535. The SCI-1 530 may be included in the PSCCH 515 and the SCI-2 535 may be included in the PSSCH 520. The SCI-1 530 may include a scheduling assignment regarding one or more resources of the sidelink channels 510 (e.g., time resources, frequency resources, and/or spatial resources). In some aspects, the scheduling assignment may include information identifying a resource reserved for utilization by one or more UEs in the sidelink network. The SCI-1 530 may also include information to enable a UE in the sidelink network to perform RSRP measurements associated with a reserved resource. The SCI-2 535 may include various types of information, such as, for example, a hybrid automatic repeat request (HARM) process ID, a new data indicator (NDI) associated with the data 540, a unique identifier associated with a transmitting UE (a unique TX ID), a unique identifier associated with a receiving UE (a unique RX ID), and/or a channel state information (CSI) report trigger.

The PSSCH 520 may also include data 540 and information such as, for example, information for decoding sidelink communications on the PSSCH 520, a quality of service (QoS) priority value, a resource reservation period, a PSSCH demodulation reference signal (DMRS) pattern, an SCI format and/or a beta offset for sidelink control information part 2 (SCI-2) 535 transmitted on the PSSCH 520, a quantity of PSSCH DMRS ports, a modulation coding scheme (MCS), a priority associated with the reserved resource, a chosen selection scheme, a policy parameter used by another UE to choose another resource selection scheme, and/or a traffic condition associated with the sidelink network.

In some aspects, the UE 505-1 may transmit both the SCI-1 530 and the SCI-2 535. In some aspects, the UE 505-1 may transmit only SCI-1 530, in which case one or more types of the information that would otherwise be transmitted in the SCI-2 535 may be transmitted in the SCI-1 530. The PSFCH 525 may be used to communicate sidelink (SL) feedback 545, such as, for example, HARQ feedback (e.g., acknowledgement or negative acknowledgement (ACK/NACK) information), transmit power control (TPC), and/or a scheduling request (SR).

In some aspects, the one or more sidelink channels 510 may use resource pools shared by the plurality of UEs. In some aspects, a scheduling assignment (e.g., included in SCI-1 530) may be transmitted in subchannels, arranged in one or more slots, including specific resources and/or resource blocks (RBs) across time. In some aspects, data 540 (e.g., on the PSSCH 520) associated with a scheduling assignment may occupy adjacent RBs in the same subframe as the scheduling assignment (e.g., using frequency division multiplexing). In some aspects, a scheduling assignment and associated data transmissions may be transmitted using non-adjacent RBs.

In some aspects, the UE 505-1 may operate using a communication mode (e.g., Mode-2 Resource Allocation Mode) where resource selection and/or scheduling is performed by the UE 505-1 (e.g., rather than TX 410). In some aspects, the UE 505-1 may perform resource selection and/or scheduling by autonomously selecting one or more of the configured sidelink resources. The UE 505-1 may use a sensed selection scheme or may use a random selection scheme to perform the autonomous selection.

In some aspects, the UE 505-1 may adaptively choose between the sensed selection scheme and the random selection scheme. The UE 505-1 may employ a random policy to adaptively choose between the sensed selection scheme and the random selection scheme. In the random policy, the UE 505-1 may choose using the sensed selection scheme with a first probability and may choose using the random selection scheme with a second probability. For instance, as shown in example 600 of FIG. 6, the UE 505-1 may choose using the sensed selection scheme with a probability p and may choose using the random selection scheme with a probability 1-p. Based at least in part on adaptively choosing between the sensed selection scheme and the random selection scheme to determine one or more sidelink resources, the UE 505-1 may transmit a sidelink communication utilizing the determined one or more sidelink resources.

Based at least in part on transmitting the sidelink communication, the UE 505-1 may receive feedback associated with the sidelink communication from a receiving UE (e.g., the UE 505-2 and/or other UEs in the sidelink network). In some aspects, the feedback may be received over the PSFCH 525 in the form of an acknowledgement (ACK) message or a negative acknowledgement (NACK) message. In some aspects, the UE 505-1 may update parameters associated with the policy (e.g., random policy) associated with transmitting the sidelink communication.

For instance, when employing the random policy, if the UE 505-1 uses the sensed selection scheme to transmit the sidelink communication and receives an ACK message from a receiving UE, the UE 505-1 may increase a value of p. When employing the random policy, if the UE 505-1 uses the sensed selection scheme to transmit the sidelink communication and receives a NACK message from the receiving UE, the UE 505-1 may decrease the value of p. When employing the random policy, if the UE 505-1 uses the random selection scheme to transmit the sidelink communication and receives an ACK message from the receiving UE, the UE 505-1 may decrease the value of p. When employing the random policy, if the UE 505-1 uses the random selection scheme to transmit the sidelink communication and receives a NACK message from the receiving UE, the UE 505-1 may increase the value of p. In some aspects, the UE 505-1 may update a value of p in real-time and/or periodically.

In some aspects, the UE 505-1 may adaptively choose to use the sensed selection scheme or may use the random selection scheme based at least in part on the policy parameter used by another UE. In some aspects, the UE 505-1 may receive information about the policy parameter in a communication received from the other UE. Based at least in part on the information about the policy parameter, the UE 505-1 may determine that the other UE has chosen using, for example, the sensed selection scheme to successfully complete a threshold number of transmissions (e.g., has received a threshold number of ACK messages) in the sidelink network. In this case, the UE 505-1 may increase the value of p and may choose using the sensed selection scheme to successfully complete transmission of the sidelink communication. In some aspects, based at least in part on the information about the policy parameter, the UE 505-1 may determine that the other UE has chosen using, for example, the sensed selection scheme and failed to complete a threshold number of transmissions (e.g., has received a threshold number of NACK messages) in the sidelink network. In this case, the UE 505-1 may decrease the value of p and may choose using the random selection scheme to avoid failing to complete a threshold number of transmissions.

Figure 6:
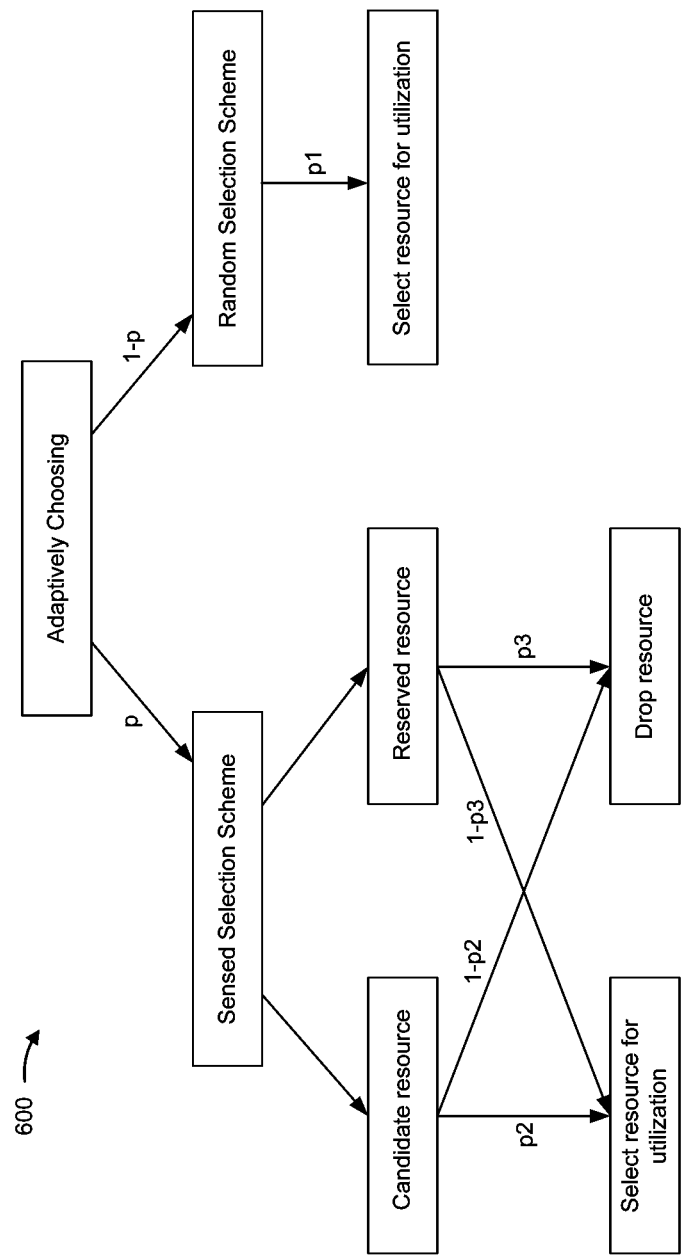
FIG. 6 is a diagram illustrating an example associated with providing probability-based utilization of sidelink resources, in accordance with various aspects of the present disclosure.

As also shown in FIG. 6, when using the random selection scheme, the UE 505-1 may randomly select a sidelink resource to transmit the sidelink communication based at least in part on a probability p1 (or drop the sidelink resource based at least in part on a probability 1-p1). In this case, the UE 505-1 may utilize the sidelink resource to transmit the sidelink communication without consideration of prior reservation of the randomly selected sidelink resource by another UE in the sidelink network.

Based at least in part on randomly selecting the sidelink resource to transmit the sidelink communication, the UE 505-1 may receive feedback (e.g., ACK or NACK message) associated with the sidelink communication from a receiving UE (e.g., the UE 505-2 and other UEs in the sidelink network). In some aspects, the UE 505-1 may update parameters (e.g., probability p1) associated with transmitting the sidelink communication. For instance, when the UE 505-1 randomly selects the sidelink resource based at least in part on the probability p1 and receives an ACK message from a receiving UE, the UE 505-1 may increase a value of p1. When the UE 505-1 randomly selects the sidelink resource based at least in1 part on the probability p1 and receives a NACK message from the receiving UE, the UE 505-1 may decrease the value of p1. In some aspects, the UE 505-1 may update a value of p1 in real-time and/or periodically.

In some aspects, the UE 505-1 may randomly select the sidelink resource to transmit the sidelink communication based at least in part on a policy parameter used by another UE. In some aspects, the UE 505-1 may receive information about the policy parameter in a communication received from the other UE. Based at least in part on the information about the policy parameter, the UE 505-1 may determine that the other UE has randomly selected a sidelink resource to successfully complete a threshold number of transmissions (e.g., has received a threshold number of ACK messages) in the sidelink network. In this case, the UE 505-1 may increase the value of p1 and may randomly select the sidelink resource to successfully complete transmission of the sidelink communication. In some aspects, based at least in part on the information about the policy parameter, the UE 505-1 may determine that the other UE has randomly selected the sidelink resource and failed to complete a threshold number of transmissions (e.g., has received a threshold number of NACK messages) in the sidelink network. In this case, the UE 505-1 may decrease the value of p1 and may drop the sidelink resource to avoid failing to complete a threshold number of transmissions.

As further shown in FIG. 6, when using the sensed selection scheme, the UE 505-1 may determine that a sidelink resource under consideration is a candidate resource available for utilization by the UE 505-1. Alternatively, the UE 505-1 may determine that the sidelink resource under consideration is a reserved resource unavailable for utilization by the UE 505-1.

When the UE 505-1 determines that the sidelink resource under consideration is a candidate resource, the UE 505-1 may select the candidate resource for utilization based at least in part on a probability p2 or the UE 505-1 may drop the candidate resource based at least in part on a probability 1-p2. In some aspects, when a value of p2 is 1, the UE 505-1 may always select to utilize the candidate resource. In some aspects, the UE 505-1 may utilize the candidate resource to transmit the sidelink communication to a receiving UE.

Based at least in part on transmitting the sidelink communication, the UE 505-1 may receive feedback (e.g., ACK or NACK message) associated with the sidelink communication from a receiving UE (e.g., the UE 505-2 and other UEs in the sidelink network). In some aspects, the UE 505-1 may update parameters (e.g., probability p2) associated with transmitting the sidelink communication. For instance, when the UE 505-1 selects the candidate resource to transmit the sidelink communication based at least in part on the probability p2 and receives an ACK message from a receiving UE, the UE 505-1 may increase a value of p2. When the UE 505-1 selects the candidate resource to transmit the sidelink communication based at least in part on the probability p2 and receives a NACK message from the receiving UE, the UE 505-1 may decrease the value of p2. In some aspects, the UE 505-1 may update a value of p2 in real-time and/or periodically.

In some aspects, the UE 505-1 may select the candidate resource to transmit the sidelink communication based at least in part on the policy parameter used by another UE. In some aspects, the UE 505-1 may receive information about the policy parameter in a communication received from the other UE. Based at least in part on the information about the policy parameter, the UE 505-1 may determine that the other UE has selected the candidate resource to successfully complete a threshold number of transmissions (e.g., has received a threshold number of ACK messages) in the sidelink network. In this case, the UE 505-1 may select the candidate resource to successfully complete transmission of the sidelink communication. In some aspects, based at least in part on the information about the policy parameter, the UE 505-1 may determine that the other UE has selected the candidate resource and failed to complete a threshold number of transmissions (e.g., has received a threshold number of NACK messages) in the sidelink network. In this case, the UE 505-1 may avoid selecting the candidate resource to avoid failing to complete a threshold number of transmissions.

In some aspects, the UE 505-1 may drop (e.g., not utilize) the candidate resource. For instance, the UE 505-1 may determine that an RSRP threshold level, against which an RSRP measurement is compared to determine a sidelink resource, may be higher than a given level. As a result, the UE 505-1 may determine that the sidelink resource is determined to be a candidate resource (available to the transmitting UE) and should have otherwise been a reserved resource (unavailable to the transmitting UE). In this case, the UE 505-1 may update (e.g., lower) the RSRP threshold level by a threshold amount, and drop the candidate resource to, for example, avoid a contention.

When the UE 505-1 determines that the sidelink resource under consideration is a reserved resource, the UE 505-1 may drop the reserved resource based at least in part on a probability p3 or the UE 505-1 may select the reserved resource for utilization based at least in part on a probability 1-p3. In some aspects, when a value of p3 is 1, the UE 505-1 may always drop the reserved resource.

In some aspects, the UE 505-1 may select to utilize the reserved resource. For instance, the UE 505-1 may determine that the RSRP threshold level, against which an RSRP measurement is compared to determine a sidelink resource, may be lower than a given level. As a result, the UE 505-1 may determine that the sidelink resource is determined to be a reserved resource (unavailable to the transmitting UE) and should have otherwise been a candidate resource (available to the transmitting UE). In this case, the UE 505-1 may update (e.g., raise) the RSRP threshold level by a threshold amount, and select to utilize the reserved resource to, for example, enable efficient utilization of sidelink resources. In some aspects, the UE 505-1 may utilize the reserved resource to transmit the sidelink communication to a receiving UE.

Based at least in part on transmitting the sidelink communication, the UE 505-1 may receive feedback (e.g., ACK or NACK message) associated with the sidelink communication from a receiving UE (e.g., the UE 505-2 and other UEs in the sidelink network). In some aspects, the UE 505-1 may update parameters (e.g., probability p3) associated with transmitting the sidelink communication. For instance, when the UE 505-1 selects the reserved resource to transmit the sidelink communication based at least in part on the probability p3 and receives an ACK message from a receiving UE, the UE 505-1 may increase a value of p3. When the UE 505-1 selects the reserved resource to transmit the sidelink communication based at least in part on the probability p3 and receives a NACK message from the receiving UE, the UE 505-1 may decrease the value of p3. In some aspects, the UE 505-1 may update a value of p3 in real-time and/or periodically.

In some aspects, the UE 505-1 may select to utilize the reserved resource based at least in part on the policy parameter used by another UE. In some aspects, the UE 505-1 may receive information about the policy parameter in a communication received from the other UE. Based at least in part on the information about the policy parameter, the UE 505-1 may determine that the other UE has selected to utilize a reserved resource to successfully complete a threshold number of transmissions (e.g., has received a threshold number of ACK messages) in the sidelink network. In this case, the UE 505-1 may select to utilize the reserved resource to successfully complete transmission of the sidelink communication. In some aspects, based at least in part on the information about the policy parameter, the UE 505-1 may determine that the other UE has selected to utilize the reserved resource and failed to complete a threshold number of transmissions (e.g., has received a threshold number of NACK messages) in the sidelink network. In this case, the UE 505-1 may avoid selecting the reserved resource to avoid failing to complete a threshold number of transmissions.

In some aspects, the UE 505-1 may select to utilize the reserved resource based at least in part on a priority associated with the sidelink communication. For instance, the UE 505-1 may select to utilize the reserved resource based at least in part on the priority associated with the sidelink communication satisfying a threshold priority level (e.g., the priority is equal to or greater than the threshold priority level). In some aspects, the UE 505-1 may select to utilize the reserved resource based at least in part on a transmission power associated with transmitting the sidelink communication. For instance, the UE 505-1 may select to utilize the reserved resource based at least in part on the transmission power associated with the sidelink communication failing to satisfy a threshold transmission power level (e.g., the transmission power is less than the threshold transmission power level). In some aspects, the UE 505-1 may select to utilize the reserved resource based at least in part on a measure of quality associated with transmitting the sidelink communication. For instance, the UE 505-1 may select to utilize the reserved resource based at least in part on the measure of quality associated with transmitting the sidelink communication satisfying a threshold quality level (e.g., measure of quality is equal to or greater than the threshold quality level).

In some aspects, values of p, p1, p2, and/or p3 may be fixed. For instance, the values of p, p1, p2, and/or p3 may be configured by, for example, TX 410. In some aspects, the values of p, p1, p2, and/or p3 may be default values stored in, for example, a memory (e.g., memory 282) of the UE 505-1. In some aspects, a default value may be a preselected value adopted by the UE 505-1 when the TX 410 does not specify another alternative approach for selecting a value.

By utilizing the probability-based utilization of sidelink resources, as described herein, the transmitting UE may choose to use the sensed selection scheme or to use the random selection scheme based at least in part on a probability p. In the random selection scheme, the transmitting UE may select to utilize a sidelink resource based at least in part on a probability p1. In the sensed selection scheme, the transmitting UE may select to utilize a candidate resource based at least in part on a probability p2 and/or to utilize a reserved resource based at least on a probability p3. Based at least in part on the probability-based utilization of sidelink resources, the transmitting UE may select to drop (e.g., not utilize) a candidate resource that is otherwise available to the transmitting UE and/or to utilize a reserved resource that is otherwise unavailable to the transmitting UE based at least in part on an amount of traffic in the sidelink network.

In this way, the transmitting UE may utilize sidelink resources based at least in part on adapting to traffic conditions in the sidelink network. In some aspects, the transmitting UE may utilize the probability-based utilization of sidelink resources based at least in part on feedback received from another UE in the sidelink network and/or a parameter associated with data communication in the sidelink network (e.g., a Q-learning approach that learns a measure of quality associated with actions taken based at least in part on traffic conditions and provides information regarding which actions to take to adapt to traffic conditions and/or a policy gradient approach that assists in optimizing a policy associated with adapting to traffic conditions to successively obtain favorable returns by gradient descent). Additionally, the transmitting UE may assist in efficient utilization of sidelink resources while minimizing delays in transmitting, for example, URLLC data and/or avoiding a contention in the sidelink network. As a result, data communication among the UEs in the sidelink network may be improved. Efficient utilization of resources of a UE (e.g., amount of processing, utilization of memory, or the like) and/or network resources (e.g., subchannels, bandwidth, or the like) may also be enabled by, for example, avoiding contentions and retransmissions due to contentions.

As indicated above, FIGS. 5 and 6 are provided as examples. Other examples may differ from what is described with regard to FIGS. 5 and 6.

Figure 7:
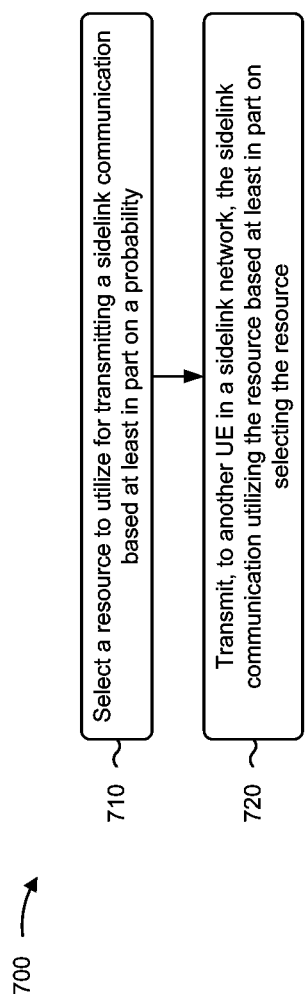
FIG. 7 is a diagram illustrating an example process associated with providing probability-based utilization of sidelink resources, in accordance with various aspects of the present disclosure.

FIG. 7 is a diagram illustrating an example process 700 performed, for example, by a user equipment (UE), in accordance with various aspects of the present disclosure. Example process 700 is an example where the UE (e.g., UE 120) performs operations associated with providing probability-based utilization of sidelink resources.

As shown in FIG. 7, in some aspects, process 700 may include selecting a resource to utilize for transmitting a sidelink communication based at least in part on a probability (block 710). For example, the UE (e.g., using determination component 808, depicted in FIG. 8) may select a resource to utilize for transmitting a sidelink communication based at least in part on a probability, as described above.

As further shown in FIG. 7, in some aspects, process 700 may include transmitting, to another UE in a sidelink network, the sidelink communication utilizing the resource based at least in part on selecting the resource (block 720). For example, the UE (e.g., using transmission component 804, depicted in FIG. 8) may transmit, to another UE in a sidelink network, the sidelink communication utilizing the resource based at least in part on selecting the resource, as described above.

Process 700 may include additional aspects, such as any single aspect or any combination of aspects described below and/or in connection with one or more other processes described elsewhere herein.

In a first aspect, the probability is a fixed probability.

In a second aspect, alone or in combination with the first aspect, the probability is preconfigured.

In a third aspect, alone or in combination with one or more of the first and second aspects, the probability has a default value.

In a fourth aspect, the probability is a random probability.

In a fifth aspect, alone or in combination with one or more of the first through fourth aspects, process 700 includes updating the probability based at least in part on a feedback message received from the other UE.

In a sixth aspect, alone or in combination with one or more of the first through fifth aspects, process 700 includes updating the probability based at least in part on a policy parameter received from the other UE.

In a seventh aspect, alone or in combination with one or more of the first through third and fifth through sixth aspects, process 700 includes determining that the resource is an unavailable resource.

In an eighth aspect, alone or in combination with one or more of the first through third and fifth through sixth aspects, process 700 includes determining that the resource is an available resource.

In a ninth aspect, alone or in combination with one or more of the first through eighth aspects, process 700 includes determining whether to use a sensed selection scheme that uses sidelink control information or to use a random selection scheme to select the resource.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
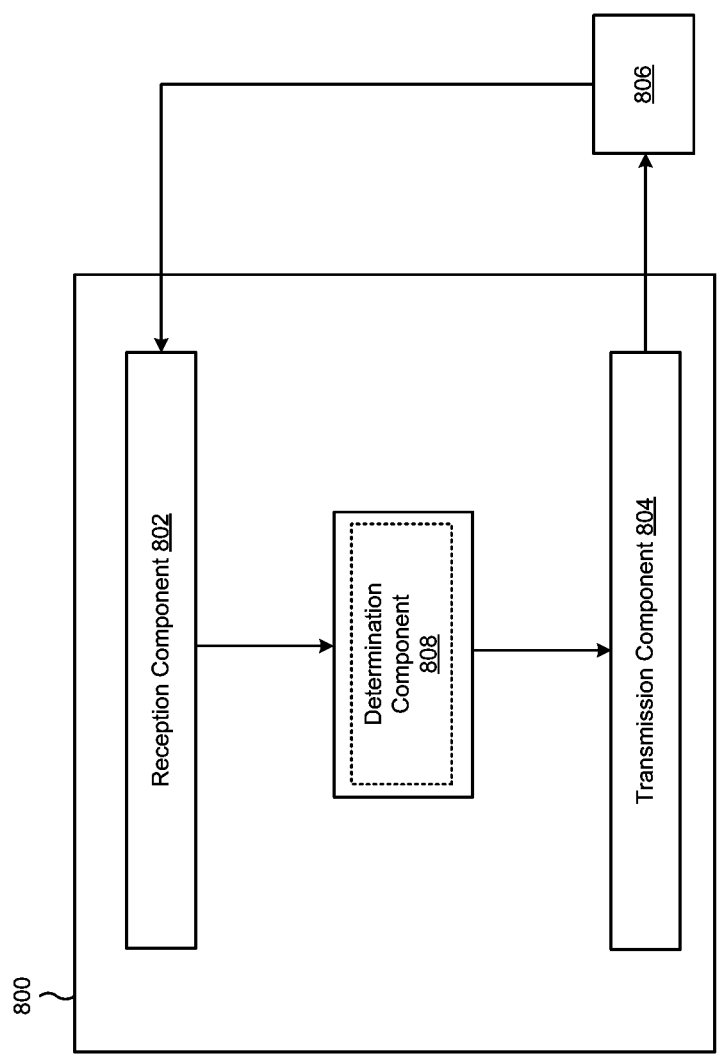
FIG. 8 is a diagram illustrating an example apparatus associated with providing probability-based utilization of sidelink resources, in accordance with various aspects of the present disclosure.

FIG. 8 is a block diagram of an example apparatus 800 for wireless communication. The apparatus 800 may be a UE (e.g., UE 120 and/or UE 505-1), or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a determination component 808, among other examples.

In some aspects, the apparatus 800 may be configured to perform one or more operations described herein in connection with FIGS. 3-6. Additionally or alternatively, the apparatus 800 may be configured to perform one or more processes described herein, such as process 700 of FIG. 7. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG.

2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The determination component 808 may select a resource to utilize for transmitting a sidelink communication based at least in part on a probability. The transmission component 804 may transmit, to another UE in a sidelink network, the sidelink communication utilizing the resource based at least in part on selecting the resource.

The determination component 808 may update the probability based at least in part on a feedback message received from the other UE.

The determination component 808 may update the probability based at least in part on a policy parameter received from the other UE.

The determination component 808 may determine that the resource is an unavailable resource.

The determination component 808 may determine that the resource is an available resource.

The determination component 808 may determine whether to use a sensed selection scheme that uses sidelink control information or to use a random selection scheme to select the resource.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The following provides an overview of aspects of the present disclosure:

Aspect 1: A method of wireless communication performed by a user equipment (UE), comprising: selecting a resource to utilize for transmitting a sidelink communication based at least in part on a probability; and transmitting, to another UE in a sidelink network, the sidelink communication utilizing the resource based at least in part on selecting the resource.

Aspect 2: The method of aspect 1, wherein the probability is a fixed probability.

Aspect 3: The method of any of aspects 1-2, wherein the probability is preconfigured.

Aspect 4: The method of any of aspects 1-3, wherein the probability has a default value.

Aspect 5: The method of any of aspects 1 and 3-4, wherein the probability is a random probability.

Aspect 6: The method of any of aspects 1 and 3-5, further comprising: updating the probability based at least in part on a feedback message received from the other UE.

Aspect 7: The method of any of aspects 1 and 3-5, further comprising: updating the probability based at least in part on a policy parameter received from the other UE.

Aspect 8: The method of any of aspects 1-7, further comprising determining that the resource is an unavailable resource.

Aspect 9: The method of any of aspects 1-8, further comprising determining that the resource is an available resource.

Aspect 10: The method of any of aspects 1-9, further comprising determining whether to use a sensed selection scheme that uses sidelink control information or to use a random selection scheme to select the resource.

Aspect 11: An apparatus for wireless communication at a device, comprising a processor; memory coupled with the processor; and instructions stored in the memory and executable by the processor to cause the apparatus to perform the method of one or more aspects of aspects 1-10.

Aspect 12: A device for wireless communication, comprising a memory and one or more processors coupled to the memory, the memory and the one or more processors configured to perform the method of one or more aspects of aspects 1-10.

Aspect 13: An apparatus for wireless communication, comprising at least one means for performing the method of one or more aspects of aspects 1-10.

Aspect 14: A non-transitory computer-readable medium storing code for wireless communication, the code comprising instructions executable by a processor to perform the method of one or more aspects of aspects 1-10.

Aspect 15: A non-transitory computer-readable medium storing a set of instructions for wireless communication, the set of instructions comprising one or more instructions that, when executed by one or more processors of a device, cause the device to perform the method of one or more aspects of aspects 1-10.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors operatively coupled to the memory, the one or more processors configured to cause the UE to:
        select a resource to utilize for transmitting a sidelink communication based at least in part on a probability;
        transmit, to another UE in a sidelink network, the sidelink communication utilizing the resource based at least in part on selecting the resource; and
        update the probability based at least in part on a feedback message received from the other UE.

2. The UE of claim 1, wherein the probability is a fixed probability.

3. The UE of claim 1, wherein the probability is preconfigured.

4. The UE of claim 1, wherein the probability has a default value.

5. The UE of claim 1, wherein the probability is a random probability.

6. The UE of claim 1, wherein the one or more processors, when updating the probability, are further configured to:
    update the probability further based at least in part on a policy parameter received from the other UE.

7. The UE of claim 1, wherein the one or more processors are further configured to determine that the resource is an unavailable resource.

8. The UE of claim 1, wherein the one or more processors are further configured to determine that the resource is an available resource.

9. The UE of claim 1, wherein the one or more processors are further configured to determine whether to use a sensed selection scheme that uses sidelink control information or to use a random selection scheme to select the resource.

10. A method of wireless communication performed by a user equipment (UE), comprising:
    selecting a resource to utilize for transmitting a sidelink communication based at least in part on a probability;
    transmitting, to another UE in a sidelink network, the sidelink communication utilizing the resource based at least in part on selecting the resource; and
    updating the probability based at least in part on a feedback message received from the other UE.

11. The method of claim 10, wherein the probability is a fixed probability.

12. The method of claim 10, wherein the probability is preconfigured.

13. The method of claim 10, wherein the probability has a default value.

14. The method of claim 10, wherein the probability is a random probability.

15. The method of claim 10, wherein updating the probability further comprises:
    updating the probability further based at least in part on a policy parameter received from the other UE.

16. The method of claim 10, further comprising determining that the resource is an unavailable resource.

17. The method of claim 10, further comprising determining that the resource is an available resource.

18. The method of claim 10, further comprising determining whether to use a sensed selection scheme that uses sidelink control information or to use a random selection scheme to select the resource.

19. A non-transitory computer-readable medium storing a set of instructions for wireless communication, the set of instructions comprising:

one or more instructions that, when executed by one or more processors of a user equipment (UE), cause the UE to:
- select a resource to utilize for transmitting a sidelink communication based at least in part on a probability;
- transmit, to another UE in a sidelink network, the sidelink communication utilizing the resource based at least in part on selecting the resource; and
- update the probability based at least in part on a feedback message received from the other UE.

20. The non-transitory computer-readable medium of claim 19, wherein the probability is a fixed probability.

21. The non-transitory computer-readable medium of claim 19, wherein the probability is preconfigured.

22. The non-transitory computer-readable medium of claim 19, wherein the probability has a default value.

23. The non-transitory computer-readable medium of claim 19, wherein the probability is a random probability.

24. The non-transitory computer-readable medium of claim 19, wherein the one or more instructions, that cause the UE to update the probability, further cause the UE to:
- update the probability further based at least in part on a policy parameter received from the other UE.

25. An apparatus for wireless communication, comprising:
- means for selecting a resource to utilize for transmitting a sidelink communication based at least in part on a probability;
- means for transmitting, to another UE in a sidelink network, the sidelink communication utilizing the resource based at least in part on selecting the resource; and
- means for updating the probability based at least in part on a feedback message received from the other UE.

26. The apparatus of claim 25, wherein the probability is a fixed probability.

27. The apparatus of claim 25, wherein the probability is preconfigured.

28. The apparatus of claim 25, wherein the probability has a default value.

29. The apparatus of claim 25, wherein the probability is a random probability.

30. The apparatus of claim 25, wherein the means for updating the probability further comprise:
- means for updating the probability further based at least in part on a policy parameter received from the other UE.

* * * * *